(12) United States Patent
Suehiro et al.

(10) Patent No.: US 7,559,681 B2
(45) Date of Patent: *Jul. 14, 2009

(54) LIGHT PIPE FOR DIRECT-TYPE BACKLIGHT AND DIRECT-TYPE BACKLIGHT

(75) Inventors: Ichiro Suehiro, Osaka (JP); Noriaki Harada, Osaka (JP); Yuji Hotta, Osaka (JP)

(73) Assignee: Nitto Denko Corporation, Osaka (JP)

( * ) Notice: Subject to any disclaimer, the term of this patent is extended or adjusted under 35 U.S.C. 154(b) by 255 days.

This patent is subject to a terminal disclaimer.

(21) Appl. No.: 11/263,616

(22) Filed: Nov. 1, 2005

(65) Prior Publication Data

US 2006/0119751 A1    Jun. 8, 2006

(30) Foreign Application Priority Data

| Nov. 8, 2004 | (JP) | .......................... P.2004-323782 |
| Mar. 24, 2005 | (JP) | .......................... P.2005-086200 |

(51) Int. Cl.
    *F21V 7/04* (2006.01)
(52) U.S. Cl. ........................ 362/558; 362/611; 362/551; 362/311; 362/330; 362/610; 362/619
(58) Field of Classification Search ................. 362/558, 362/611, 551, 31, 311, 330, 511, 560, 609, 362/610, 618, 619, 624, 625; 349/5
See application file for complete search history.

(56) References Cited

U.S. PATENT DOCUMENTS

| 5,894,539 | A   | * | 4/1999  | Epstein ........................ 385/133 |
| 6,731,355 | B2  | * | 5/2004  | Miyashita ..................... 349/65   |
| 7,025,482 | B2  | * | 4/2006  | Yamashita et al. .......... 362/511      |
| 2003/0090888 | A1 | * | 5/2003  | Mizutani et al. .............. 362/31   |
| 2005/0237765 | A1 |   | 10/2005 | Suehiro et al.                          |
| 2005/0270716 | A1 | * | 12/2005 | Kung et al. ................... 362/33  |

FOREIGN PATENT DOCUMENTS

JP    2000-184137 A    6/2000

* cited by examiner

*Primary Examiner*—Sandra L O'Shea
*Assistant Examiner*—Jessica L McMillan
(74) *Attorney, Agent, or Firm*—Sughrue Mion, PLLC

(57) ABSTRACT

The present invention provides a light pipe for a direct-type backlight having an upper surface and a lower surface, which has: a light reflecting member provided on the upper surface; and plural light scattering members formed concentrically on at least one surface selected from the upper surface and the lower surface, wherein each of the plural light scattering members is a circular groove or a circular projection, wherein each area between respective light scattering members is substantially the same.

13 Claims, 7 Drawing Sheets

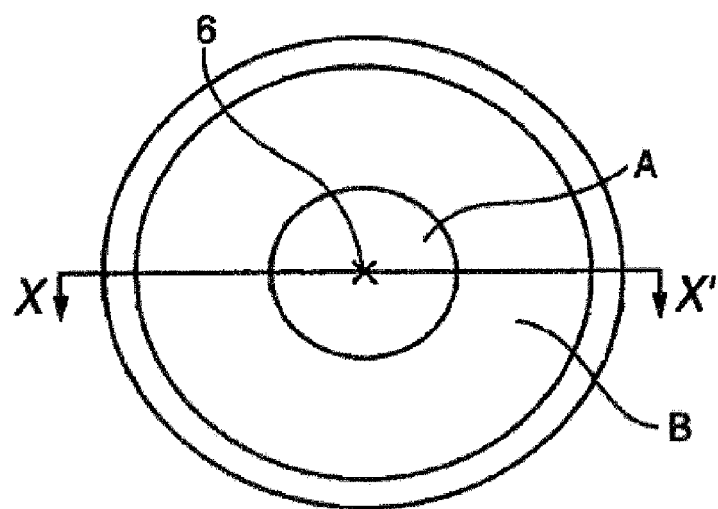

LIGHT PIPE FOR DIRECT-TYPE BACKLIGHT AND DIRECT-TYPE BACKLIGHT

FIELD OF THE INVENTION

The present invention relates to a light pipe for a direct-type backlight used in a liquid crystal display and a direct-type backlight having the light pipe.

BACKGROUND OF THE INVENTION

There has been reported a planer light source device using an optical semiconductor device (e.g., LED) in which a large number of grooves having a shape of a semi-circular in sectional view are formed concentrically in order to scatter light (e.g. see Reference 1).

[Reference 1] JP 2000-184137 A

However, in the planar light source device described above, sufficient uniformity of light emission in a plane has not been obtained yet.

SUMMARY OF THE INVENTION

An object of the present invention is to provide a light pipe by which the amount of light emission in a plane of a direct-type backlight can be made more uniform, and a direct-type backlight that is more uniform in the amount of light in a plane.

Other objects and effects of the present invention will become apparent from the following description.

The present inventors have made eager investigation to examine the problem. As a result, it has been found that the foregoing objects can be achieved by the following light pipe and direct-type backlight. With this finding, the present invention is accomplished.

The present invention is mainly directed to the following items:

(1) A light pipe for a direct-type backlight having an upper surface and a lower surface, which comprises: a light reflecting member provided on the upper surface; and plural light scattering members formed concentrically on at least one surface selected from the upper surface and the lower surface, wherein each of the plural light scattering members is a circular groove or a circular projection, wherein each area between respective light scattering members is substantially the same.

(2) The light pipe for a direct-type backlight according to item (1), wherein a sectional shape of at least one of the plural light scattering members is a triangle.

(3) The light pipe for a direct-type backlight according to item (2), wherein a sectional shape of at least one of the plural light scattering members is a right triangle.

(4) The light pipe for a direct-type backlight according to item (1), wherein the light reflecting member is a concave having a shape of an inverted conically shape.

(5) The light pipe for a direct-type backlight according to item (4), wherein the light reflecting member is a concave having a curved surface obtained by 180° rotation with respect to y axis of a curved line satisfying the following expression (I):

$$y = a|x|^4 + b|x|^3 + c|x|^2 + d|x| + e \quad (I)$$

$(-t \leq x \leq t, -m/2 \leq y \leq m/2, -1 \leq a \leq 1, -2 \leq b \leq 2, -3 \leq c \leq 3, -3 \leq d < 3, -m/2 \leq e \leq m/2, 0 < t \leq m)$ wherein x is the horizontal distance (mm) from the origin; y is the vertical distance (mm) from the origin; a, b, c, d and e are constants; and m is the thickness (mm) of the light pipe, on the assumption of a coordinate system with x and y axes as horizontal and vertical axes passing through a center of gravity of the light pipe as the origin of the two coordinate axes.

(6) The light pipe for a direct-type backlight according to item (4), wherein the conically shape has: a diameter of the bottom surface of 3 to 10 mm; and a height of 0.1 to 2 mm.

(7) The light pipe for a direct-type backlight according to item (1), wherein a metal thin film is further formed along the light reflecting member.

(8) The light pipe for a direct-type backlight according to item (1), wherein a metal particle-dispersed resin layer is further formed along the light reflecting member.

(9) The light pipe for a direct-type backlight according to item (1), wherein the light scattering members are formed on the upper surface of the light pipe.

(10) The light pipe for a direct-type backlight according to item (1), wherein the number of light scattering members is from 50 to 700.

(11) The direct-type backlight comprising the light pipe for a direct-type backlight according to item (1).

(12) The direct-type backlight according to item (11), which further comprises a reflecting plate and an optical semiconductor device.

(13) The direct-type backlight according to item (12), wherein the reflecting plate has an opening portion, wherein the optical semiconductor device is disposed on the opening portion.

According to the present invention, there can be provided a light pipe by which the amount of light emission in a plane of a direct-type backlight can be made more uniform, and a direct-type backlight that is more uniform in the amount of light in a plane.

BRIEF DESCRIPTION OF THE DRAWINGS

FIG. 4A is a plan view and FIG. 4B is a sectional view showing a shape of light scattering members used in the present invention.

Figure 1A:
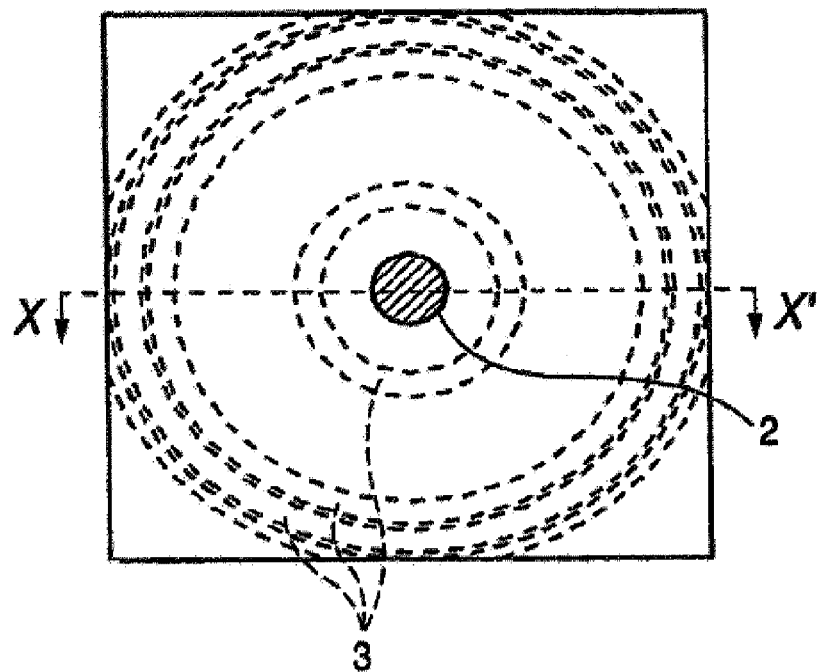
FIG. 1A is a plan view and FIG. 1B is a sectional view of an embodiment of a light pipe of the present invention.

The reference numerals used in the drawings denote the followings, respectively.

1: light pipe
2: light reflecting member
3: light scattering member
4: metal thin film or metal particle-dispersed resin layer
5: reflecting layer
6: center of concentric circles
7: reflecting plate 8: optical semiconductor element
9: wiring circuit board.
10: sealing resin
11: optical semiconductor device
12: optical semiconductor board
13: fixing member

DETAILED DESCRIPTION OF THE INVENTION

The light pipe for a direct-type backlight having an upper surface and a lower surface, according to the present invention, has: a light reflecting member provided on an upper surface of the light pipe; and plural light scattering members formed concentrically on at least one surface selected from the upper surface and the lower surface of the light pipe, and each of the plural light scattering members is a circular groove or a circular projection.

Thereby, a light from an optical semiconductor device is reflected and scattered into the light pipe by the light reflecting member and/or the light scattering members, and further reflected by the lower surface of the light pipe, so that the light can be emitted efficiently and uniformly from the upper surface of the light pipe.

Figure 1B:
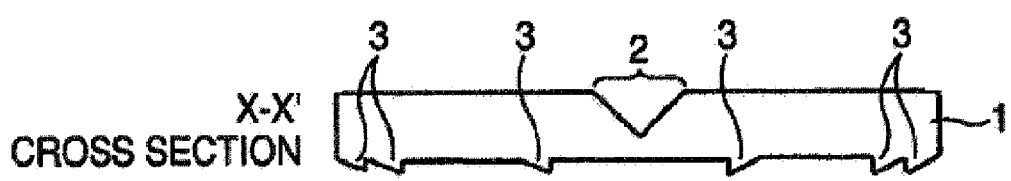

FIGS. 1A and 1B show an embodiment of a light pipe for a direct-type backlight of the present invention.

In FIGS. 1A and 1B, a light reflecting member 2 is provided on the upper surface of the light pipe 1, whereas light scattering members 3 are formed on the lower surface of the light pipe 1.

In the present invention, the light pipe 1 comprises a resin such as an epoxy resin, an acrylic resin, a urethane resin or a polycarbodiimide resin.

Figure 2:
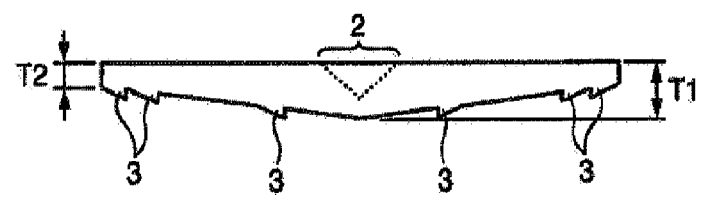
FIG. 2 is a sectional view of an embodiment of a light pipe of the present invention.

The planar shape of the light pipe 1 is not particularly limited but preferably rectangular. When the light pipe 1 has a shape of a rectangle, the length of each side of the rectangle is preferably from 30 to 100 mm. The thickness of the light pipe is preferably from 1 to 3 mm. In the present invention, the thickness of a light pipe means a thickness of a light pipe without including the light reflecting member and the light scattering members. More preferably, the sectional shape of the light pipe 1 is a taper shape as shown in FIG. 2, and the thickness T1 of the thickest portion of the light pipe 1 is from 1 to 3 mm, whereas the thickness T2 of the peripheral portion of the light pipe 1 is from 0.2 to 0.5 mm. Side surfaces of the light pipe are preferably glossy surfaces by subjecting to a process such as a metal vapor deposition process, in order to prevent the reflected and scattered light from going out of the light pipe.

The light pipe 1 is produced by a method such as the transfer molding or the press molding.

In the present invention, the term "upper surface" of a light pipe means a surface from which a light is observed when the light pipe is used in a direct-type backlight, and the term "lower surface" of a light pipe means a surface opposite to the upper surface.

In the present invention, the term "light reflecting member" refers to a section that has a function of blocking a light directly emitted from an optical semiconductor device of a direct-type backlight to the outside, reflecting the light, and scattering the light into a light pipe. From the view point of showing such a function efficiently, it is preferable that the light reflecting member is formed so as to locate in a position right above the optical semiconductor device.

To bring out this function, as shown in FIGS. 3A to 3F, the light pipe has a large number of fine concavoconvexes or concaves as the light reflecting member 2. When forming the concavoconvexes, the shape of each concavoconvex is not particularly limited but preferably semispherical shape, pyramidal shape or random shape without regularity, as long as this function can be fulfilled. Although the size of one concavoconvex is not particularly limited, when the concavoconvex has semispherical shape, the curvature radius of each concaveconvex is preferably from 1 to 50 μm, and the height of each concavoconvex is preferably from 1 to 50 μm, more preferably 15 to 30 μm.

On the other hand, when forming the concaves, the shape of the concave is preferably an inverted conically shape, although the shape of the concave is not particularly limited as long as this function can be fulfilled. In the present invention, the term "inverted conically shape" includes not only an inverted circular cone shape but also a distorted inverted circular cone shape having a slope inclined variously.

Figure 3A:
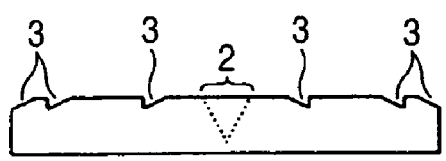
FIGS. 3A to 3F are sectional views of various embodiments of light pipes of the present invention.
Figure 3B:
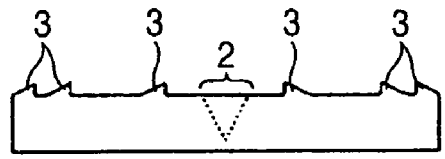
Figure 3C:
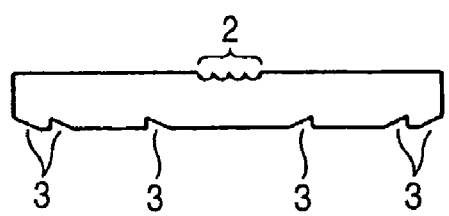
Figure 3D:
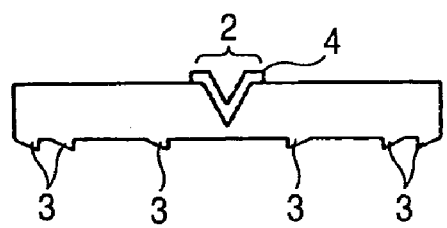
Figure 3E:
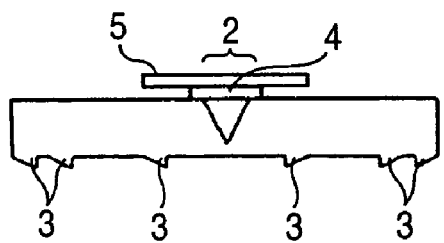
Figure 3F:
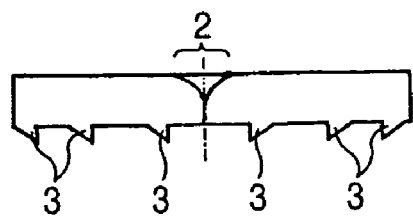

From the viewpoint that a light directly emitted from the optical semiconductor toward the outside can be blocked and reflected easily, it is more preferable that the concave has a curved surface which is designed so as to totally reflect a light, which is emitted from the optical semiconductor device toward the light pipe, in accordance with each incident angle of the light with reference to the light pipe, as shown in FIG. 3F. On the assumption of a coordinate system with x and y axes as horizontal and vertical axes passing through the center of gravity of the light pipe as the origin of the two coordinate axes, such a curved surface is obtained by 180° rotation with respect to the y axis of a curved line obtained in accordance with the following expression (I):

$$y=a|x|^4+b|x|^3+c|x|^2+d|x|+e \tag{I}$$

$$(-t \leq x \leq t, -m/2 \leq y \leq m/2, -1 \leq a \leq 1, -2 \leq b \leq 2, \\ -3 \leq c \leq 3, -3 \leq d \leq 3, -m/2 \leq e \leq m/2, 0 < t \leq m)$$

wherein x is the horizontal distance (mm) from the origin; y is the vertical distance (mm) from the origin; a, b, c, d and e are constants; and m is the thickness (mm) of the light pipe.

When the concave has an inverted conically shape, it is preferable that the diameter of the bottom surface of the conically shape is 3 to 10 mm and the height of the conically shape is 0.1 to 2 mm, although the size of the concave is not particularly limited.

The shape and size of the bottom surface of the light reflecting member 2 is not particularly limited as long as it is possible to fulfill the aforementioned function and exhibit the effect of the present invention. It is preferable that the bottom surface of the light reflecting member 2 is circular and has a size enable to be disposed inward of the light scattering member that is nearest to the center.

The concavoconvexes or concaves (hereinafter also referred to as "patterns") of the light reflecting member 2 can be formed by use of a mold having a surface with patterns reverse to the concavoconvexes or concaves of the light reflecting member when the light pipe is produced. For example, in the case of transfer molding, the concavoconvexes or concaves are formed by use of a transfer molding mold having such reversal patterns formed in a portion corresponding to the upper surface of the light pipe. In the case of press molding, the concavoconvexes or concaves are formed in such a manner that a surface of a resin sheet produced in advance is pressed by a press plate having the reversal patterns.

The mold is produced as follows. For example, a polyimide sheet is processed into a predetermined pattern shape by laser machining and further electrolessly plated with nickel to smoothen the surface of the polyimide sheet. Thus, a nickel thin film is formed. Then, the nickel thin film is transferred onto a mold or a press plate to thereby produce a mold capable of processing the light reflecting member into a predetermined pattern.

From the viewpoint that light directly emitted from the optical semiconductor element toward the outside can be blocked and reflected easily, it is preferable that either metal thin film or metal particle-dispersed resin layer 4 is formed along the light reflecting member 2 as shown in FIG. 3D. Examples of the metal used in the metal thin film include silver or aluminum. Examples of the metal particles used in the metal particle-dispersed resin layer include fine particles of metal oxide such as titanium oxide or zirconium oxide. For example, the metal thin film can be formed on the upper surface of the light reflecting member in such a manner that sputtering is performed while the other portions than the light reflecting member are masked. On the other hand, the metal particle-dispersed resin layer can be formed by a method such as casting, spin coating, spraying, or laminating method wherein a resin processed into a sheet shape in advance is heated and pressed. Incidentally, when the production of the light pipe is performed by transfer molding, the metal thin film or metal particle-dispersed resin layer is formed after the production of the light pipe since both patterning and molding are made simultaneously. When the production of the light pipe is performed by press molding, the metal thin film or metal particle-dispersed resin layer may be formed before or after patterning due to the press plate. The thickness of the metal thin film or metal particle-dispersed resin layer is preferably from 0.05 to 0.5 µm. Or when a concave is formed in the light reflecting member, the metal thin film or metal particle-dispersed resin layer 4 may be provided to block the concave as shown in FIG. 3E so that a reflecting layer 5 made of an acrylic resin can be provided on the metal thin film or metal particle-dispersed resin layer 4.

In the present invention, the term "light scattering members" means portions having a function for reflecting light emitted from the optical semiconductor element of the direct-type backlight and scattering the light into the light pipe or toward the upper surface of the light pipe.

As shown in FIGS. 3A to 3F, plural light scattering members are formed concentrically on at least one surface selected from the upper surface and the lower surface of the light pipe. The light scattering members 3 are arranged so that each area between respective concentric circles of respective light scattering members is substantially the same. The term "substantially the same" means that a slight difference is regarded as "the same" as long as the effect of the present invention can be exhibited. For example, areas different within a range of ±5% are regarded as "substantially the same" because it cannot be said that the areas are substantially different. The difference is preferably within a range of ±3%, more preferably within a range of ±1%. Moreover, when the light pipe according to the present invention is viewed from a surface where light emission is observed, the circular light scattering members 3 are preferably formed to encircle the light reflecting member 2.

From the viewpoint of formability, it is preferable that the light scattering members are formed in the upper surface of the light pipe. It is further preferable that the centers of the concentric circles are located in a position corresponding to the center of gravity of the light pipe.

In this specification, the term "area between respective concentric circles" of the light scattering members means each area (B) calculated as a difference between areas of each concentric circle that are adjacent to each other, as shown in FIGS. 4A and 4B. The term "areas of each concentric circle" means the area of a circle with the distance from the center 6 of the circle to the center of the width of each light scattering member as its radius. From the viewpoint of effectively guiding light wave, the area between respective concentric circles of the light scattering members is preferably from about 1.6 mm$^2$ to about 85 mm$^2$, more preferably about 2.5 mm$^2$ to about 30 mm$^2$. Incidentally, in the present invention, the term "center circle" means a circle with the distance from the center 6 of the circle to the center of the width of a groove or projection in one of the light scattering members nearest to the center as its radius. The radius of the center circle is preferably from 5 to 10 mm.

As shown in FIGS. 3A to 3F, the light scattering members 3 are provided as grooves or projections with respect to the light pipe 1. A polygon such as a triangle or a rectangle, a semicircle, or a semi-ellipse is preferably used as the sectional shape of each light scattering member 3. A triangle is further preferable. The light scattering members need not have the same sectional shape as long as the effect of the present invention can be exhibited.

Figure 5A:
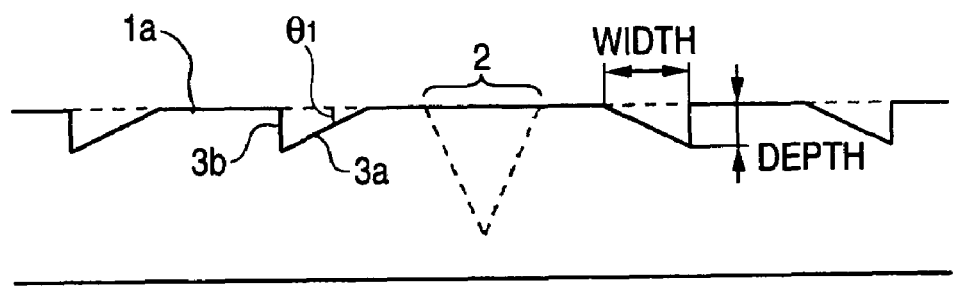
FIGS. 5A and 5B are sectional views showing light scattering members used in the present invention.

When each light scattering member 3 is provided as a groove having a shape of a triangle in sectional view, as shown in FIG. 5A, the groove has a surface 3a that is in a position near the light reflecting member 2 and a surface 3b that is in a position away from the light reflecting member 2. An angle ($\theta_1$) defined by the surface 3a and the surface 1a of the light pipe 1 is preferably from 20 to 50 degrees, more preferably from 30 to 45 degrees. When the groove has a shape of a triangle in sectional view, the triangle is preferably a right triangle, more preferably a right triangle such that the surface 3a corresponds to a hypotenuse of the right triangle. Also when the groove has a shape of a right triangle in sectional view, the angle ($\theta_1$) defined by the hypotenuse and the surface 1a of the light pipe 1 is preferably from 15 to 50 degrees, more preferably from 20 to 35 degrees.

Figure 5B:
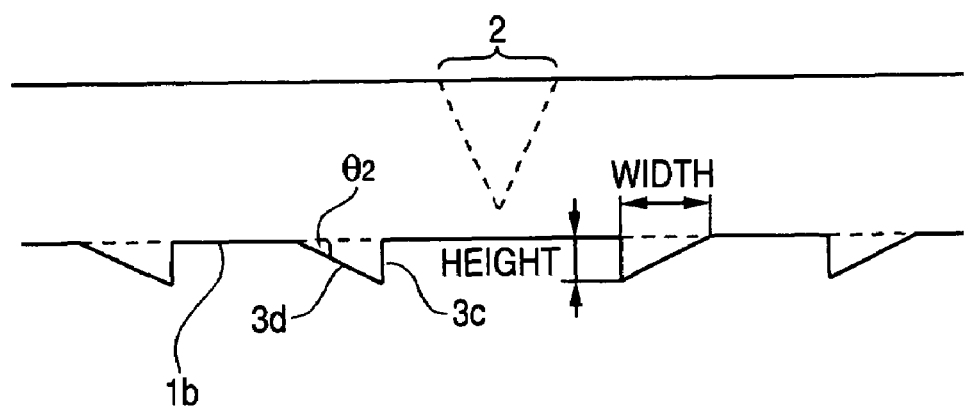

When each light scattering member 3 is provided as a projection having a shape of a triangle in sectional view, as shown in FIG. 5B, the projection has a surface 3c that is in a position near the light reflecting member 2 and a surface 3d that is in a position away from the light reflecting member 2. An angle ($\theta_2$) defined by the surface 3d and the surface 1b of the light pipe 1 is preferably from 15 to 50 degrees, more preferably 20 to 35 degrees. When the projection has a shape of a triangle in sectional view, the triangle is preferably a right triangle, more preferably a right triangle such that the surface 3d corresponds to a hypotenuse of the right triangle. Also when the projection has a shape of a right triangle in sectional view, the angle ($\theta_2$) defined by the hypotenuse and the surface 1b of the light pipe 1 is preferably from 15 to 50 degrees, more preferably from 20 to 35 degrees.

The forms of the light scattering members are not limited to the shape shown in FIGS. 5A and 5B. Namely, the light scattering members provided as grooves can be provided on the upper surface and/or the lower surface of the light pipe, and the light scattering members provided as projections can be provided on the upper surface and/or the lower surface of the light pipe.

To uniformize the quantity of light emission in the surface of the light pipe 1, it is preferable that the value of $\theta_1$ or $\theta_2$ increases stepwise as the location goes from the center of the concentric circles to the outer edge. Although the value of $\theta_1$ or $\theta_2$ may increase stepwise in accordance with each light scattering member as the location goes from the center of the concentric circles to the outer edge, it is preferable from easiness to design that the value of $\theta_1$ or $\theta_2$ increases stepwise in accordance with a number of light scattering members. The "number of light scattering members" is preferably 10 to 25, more preferably 15 to 20. The term "stepwise" means that the quantity of change of $\theta_1$ or $\theta_2$ is preferably from 1 to 2-degrees, more preferably from 1.5 to 1.75 degrees.

The number of light scattering members formed in one surface of the light pipe is preferably from 50 to 700, more preferably from 150 to 500. From the viewpoint of improvement in light extracting efficiency and insurance in uniformity of emission light intensity in the surface, the width of each light scattering member is preferably from 1 to 100 μm, more preferably 20 to 70 μm, further preferably 20 to 50 μm. The depth or height of each light scattering member is preferably from 0.5 to 120 μm, more preferably 10 to 30 μm.

The light scattering members can be formed in the same manner as the light reflecting member. A mold for forming the light scattering members can be produced in the same manner as the mold for forming the light reflecting member.

The present invention also provides a direct-type backlight having the light pipe.

Figure 6A:
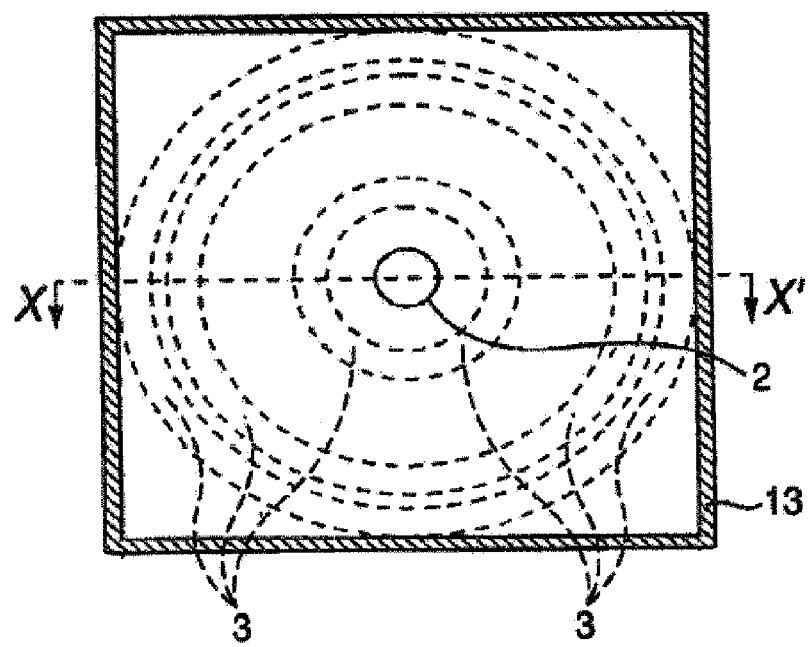
FIG. 6A is a plan view and FIG. 6B is a sectional view of an embodiment of a direct-type backlight of the present invention.
Figure 6B:
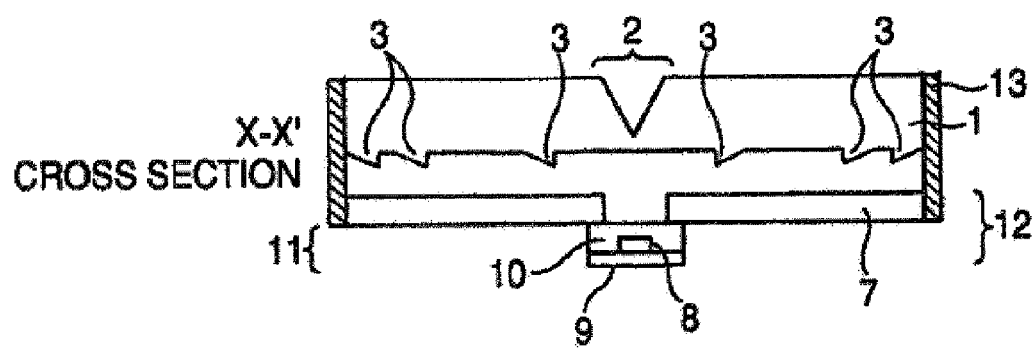

FIGS. 6A and 6B show a direct-type backlight as an embodiment of the present invention.

An embodiment of FIGS. 6A and 6B show a direct-type backlight includes:

an optical semiconductor board 12 having: an optical semiconductor element 11 having an optical semiconductor element 8 mounted on a wiring circuit board 9, and a resin layer 10 for sealing the optical semiconductor element 8; and a reflecting plate 7;

a light pipe 1; and a fixing member 13.

In the present invention, the direct-type backlight preferably has a reflecting plate and an optical semiconductor device.

The optical semiconductor element 11 used in the present invention is produced by a general method with use of the general wiring circuit board 9, the optical semiconductor element 8 and the resin layer 10.

The optical semiconductor element 11 used in the present invention preferably has light directivity of from 50 to 70 degrees. From the viewpoint of the light reflecting member's reflecting light to uniformize light emission in the surface, it is preferable that the optical semiconductor element 11 has such a luminous intensity distribution that light intensity in an oblique direction is stronger than light intensity in a direction perpendicular to the center of the optical semiconductor element.

Examples of the reflecting plate 7 include a resin plate such as an acrylic plate, and a metal plate such as a galvanized iron plate. It is preferable that the surface of the reflecting plate 7 is processed into a mirror surface by silver vapor deposition. The thickness of the reflecting plate 7 is preferably from 0.3 to 1 mm.

Figure 7A:
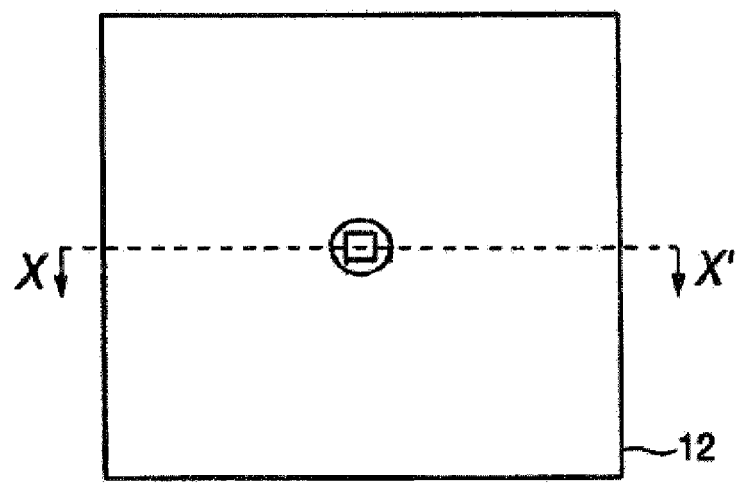
FIG. 7A is a plan view and FIG. 7B is a sectional view of an embodiment of an optical semiconductor board used in the present invention.
Figure 7B:
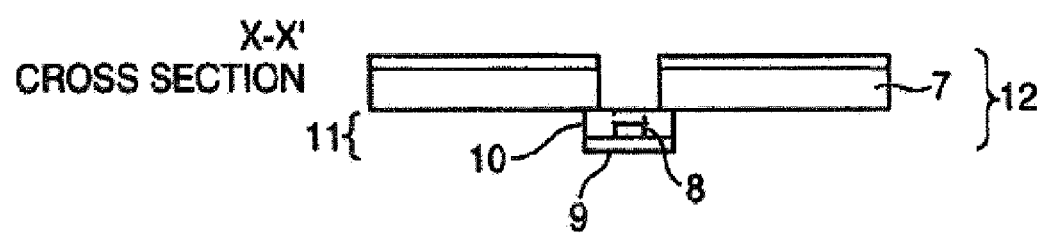

In the present invention, the reflecting plate preferably has an opening portion, and the optical semiconductor device is preferably disposed on the opening portion. As shown in FIGS. 7A and 7B, the optical semiconductor board 12 can be prepared in such a manner that after an opening portion is provided on the reflecting plate 7, the optical semiconductor element 11 is bonded to the opening portion by an adhesive agent. From the viewpoint of uniformizing light emission in the surface, it is preferable that the optical semiconductor element 11 does not protrude upward from the reflecting plate 7.

The direct-type backlight according to the present invention is preferably produced in such a manner that the light pipe 1 is placed on the optical semiconductor board 12 and the circumference of the light pipe 1 is fixed by the fixing member 13 which is formed as a frame composed of an adhesive agent or a sealing material.

EXAMPLES

The present invention is now illustrated in greater detail with reference to Examples and Comparative Examples, but it should be understood that the present invention is not to be construed as being limited thereto.

Example 1

Production of Light Pipe A

A light pipe A (material: acrylic resin, thickness: 2 mm, size: 50 mm×50 mm) having a light reflecting member in a surface, and protrusive light scattering members in an opposite surface was produced by press molding with use of a mold. A silver thin film was further formed in a side surface of the conical concave of the light reflecting member by vapor deposition. The transmittivity of the side surface was measured with a multi-channel photo detector (MCPD3000; manufactured by Otsuka Electronics Co., Ltd.). As a result, the transmittivity was 5%.

[Light Reflecting Member]

Circular cone with a diameter of the base surface of 9.0 mm and a depth of 1.9 mm and with a position corresponding to the center of gravity of the light pipe as its center

[Protrusive Light Scattering Members]

Area of the center circle: 63.6 mm² (radius=about 4.5 mm)

Number of concentric circles: 150

Area between respective concentric circles of light scattering member: 25.8 mm² (the radius of the outermost circle=about 35.4 mm)

Shape of each projection: width=60 μm, height=22 μm, sectional shape=right triangle having a hypotenuse that is in a position away from the light reflecting member, $\theta_2$ was set as follows.

From the center of the concentric circles to the 15th light scattering member: 20.0 degrees From the 16th light scattering member to the 30th light scattering member: 21.5 degrees From the 31st light scattering member to the 45th light scattering member: 23.0 degrees From the 46th light scattering member to the 60th light scattering member: 24.5 degrees From the 61st light scattering member to the 75th light scattering member: 26.0 degrees From the 76th light scattering member to the 90th light scattering member: 27.5 degrees From the 91st light scattering member to the 105th light scattering member: 29.0 degrees From the 106th light scattering member to the 120th light scattering member: 30.5 degrees From the 121st light scattering member to the 135th light scattering member: 32.0 degrees From the 136th light scattering member to the 150th light scattering member: 33.5 degrees That is, the value of $\theta_2$ was set so that the value of $\theta_2$ increased stepwise by 1.5 degrees in accordance with every 15 light scattering members as the location went from the center of the concentric circles toward the outer edge.

Production Example 1

Production of Optical Semiconductor Element

An optical semiconductor element was mounted in a center portion of a white board (CS-3965 with a size of 10 mm×10 mm, and a thickness of 0.06 mm; manufactured by Risho Kogyo Co., Ltd.) and wired. The optical semiconductor element was coated with a 15 μm-thick high reflective index polymer (polycarbodiimide (refractive index: 1.70) containing 40% by weight of silica filler (mean particle size: 100 nm)) having a scattering function. The high reflective index polymer was cured at 150° C. for an hour. An epoxy resin sheet (0.25 mm thick) was further placed on the high reflective index polymer. A nickel stamper (having a large number of concaves having a width of 10 μm and having an aspect ratio of 1:1 (height 10 μm)) having a size of 7 mm×7 mm for surface treatment was placed on the sheet. A vacuum laminator was used for sealing the optical semiconductor element at 140° C. under 0.1 MPa for 60 seconds. Thus, an optical semiconductor element subjected to surface treatment was obtained. An electric current was supplied to the optical semiconductor element in the condition that a cable was connected and wired to the optical semiconductor board.

Production Example 2

Production of Reflecting Plate

A silver vapor deposition sheet (SU-115 having a thickness of 57 μm; manufactured by Mitsui Chemicals, Inc.) was stuck to a surface of a zinc-plated steel plate (galvanized iron plate with a size of 50 mm×50 mm and a thickness of 0.5 mm) having an 8 mm-diameter hole formed in the center portion. Thus, a reflecting plate was obtained.

Example 2

Production of Direct-Type Backlight A

The optical semiconductor element obtained in Production Example 1 was bonded to a surface of the reflecting plate obtained in Production Example 2 and opposite to the reflecting surface of the reflecting plate, by an optical adhesive agent (NOA78; manufactured by Norland). Thus an optical semiconductor board was obtained. The optical semiconductor element and the reflecting plate were disposed so that the center of the hole of the reflecting plate was coincident with the center of the optical semiconductor element in a vertical direction.

The light pipe A obtained in Example 1 was placed on the optical semiconductor board and four-direction end surfaces of the light pipe were fixed by a frame. Thus, a direct-type backlight A (with a size of 50 mm×50 mm and a thickness of about 3 mm (2.867 mm)) was obtained. Incidentally, the optical semiconductor board and the light pipe were disposed so that the center of the optical semiconductor board was coincident with the center of the light pipe in a vertical direction.

Example 3

Production of Light Pipe B

A light pipe B (material: acrylic resin, thickness: 2 mm, size: 50 mm×50 mm) having a light reflecting member in a surface, and protrusive light scattering members in an opposite surface was produced by press molding with use of a mold.

[Light Reflecting Member]

On the assumption of a coordinate system with the center of gravity of the light pipe as its origin and with horizontal and vertical axes passing through the origin as x and y axes, the light reflecting member was shaped like an inverted circular cone which was obtained by 180° rotation (with respect to the y axis) of a curve obtained by the expression (II):

$$y = 0.0099 * |x|^4 + 0.1419 * |x|^3 - 0.5814 * |x|^2 + 1.8891 * |x| + 0.0012 \quad (II)$$

$$-1.5 \leq x \leq 1.5, \ 0.0012 \leq y \leq 1$$

wherein x is the horizontal distance (mm) from the origin, and y is the vertical distance (mm) from the origin.

[Protrusive Light Scattering Members]

They were produced in the same manner as in Example 1.

Example 4

Production of Direct-Type Backlight B

The optical semiconductor element obtained in Production Example 1 was bonded to a surface of the reflecting plate obtained in Production Example 2 and opposite to the reflecting surface of the reflecting plate, by an optical adhesive agent (NOA78; manufactured by Norland). Thus, an optical semiconductor board was obtained. The optical semiconductor element and the reflecting plate were disposed so that the center of the hole of the reflecting plate was coincident with the center of the optical semiconductor element in a vertical direction.

The light pipe B obtained in Example 3 was placed on the optical semiconductor board and four-direction end surfaces of the light pipe were fixed by a frame. Thus, a direct-type backlight B (with a size of 50 mm×50 mm and a thickness of about 3 mm (2.867 mm)) was obtained. Incidentally, the optical semiconductor board and the light pipe were disposed so that the center of the optical semiconductor board was coincident with the center of the light pipe in a vertical direction.

Comparative Example 1

Production of Direct-Type Backlight C

A light pipe C (material: acrylic resin, thickness: 2 mm, size: 50 mm×50 mm) having a light reflecting member of the same shape as in Example 1 in one surface was produced by press molding with use of a mold. A silver thin film was further formed in a side surface of the conical concave of the light reflecting member by vapor deposition. The transmittivity of the side surface was measured with a multi-channel photo detector (MCPD3000; manufactured by Otsuka Electronics Co., Ltd.). As a result, the transmittivity was 5%. The light pipe C thus obtained was used for producing a direct-type backlight C in the same manner as in Example 2.

Test Example 1

Evaluation of Uniformity of Light Emission in Surface

Figure 8A:
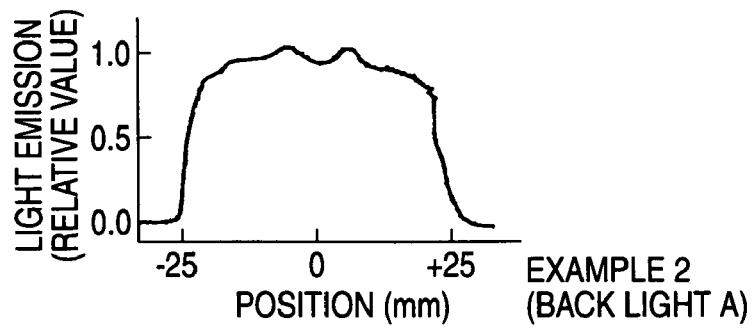
FIGS. 8A to 8C show results of light emission of direct-type backlights obtained in Examples and Comparative Example, measured with a brightness tester.
Figure 8B:
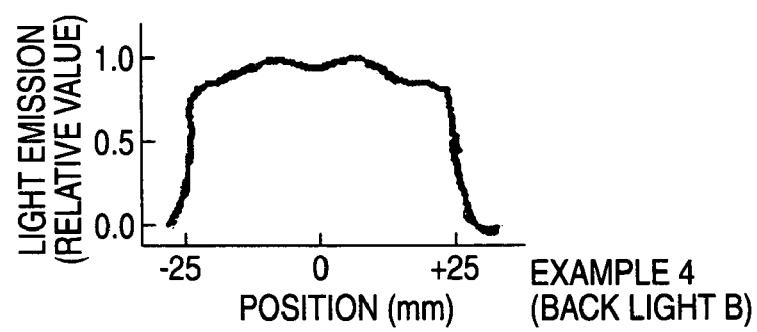
Figure 8C:
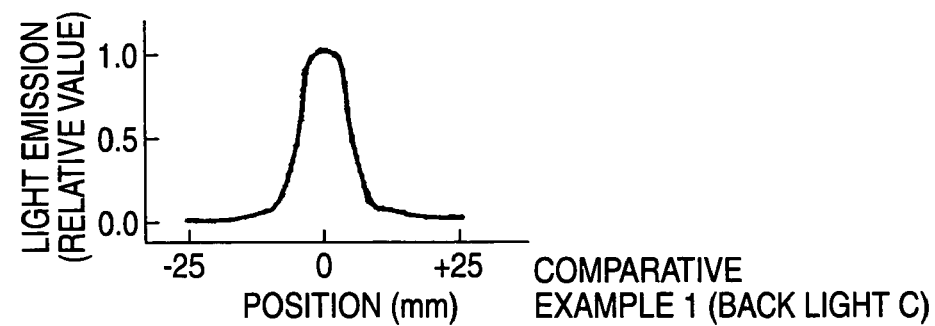

Uniformity of light emission of each of the direct-type backlights A to C produced in Examples 2 and 4 and Comparative Example 1 was measured with a brightness tester (Bm-9x0.2°; manufactured by Topcon Corp.). FIG. 8 shows results of the measurement.

Consequently, it is apparent that a uniform quantity of light emission in a widthwise direction of the surface can be obtained in the direct-type backlight A and B produced in each of Examples 2 and 4. On the other hand, it is apparent that uniform light emission cannot be obtained in the direct-type backlight C produced in Comparative Example 1 because light emission is concentrated in a place near to the optical semiconductor element.

The direct-type backlight according to the present invention can be used for backlighting a liquid crystal display.

While the present invention has been described in detail and with reference to specific embodiments thereof, it will be apparent to one skilled in the art that various changes and modifications can be made therein without departing from the spirit and scope thereof.

The present application is based on Japanese Patent Application Nos. 2004-323782 filed on Nov. 8, 2004 and 2005-086200 filed on Mar. 24, 2005, and the contents thereof are incorporated herein by reference.

What is claimed is:

1. A light pipe for a direct-type backlight having an upper surface and a lower surface, which comprises:
    a light reflecting member provided on the upper surface; and
    plural light scattering members formed concentrically on at least one surface selected from the upper surface and the lower surface, wherein each of the plural light scattering members is a circular groove or a circular projection,
    wherein each area between respective light scattering members is substantially the same.

2. The light pipe for a direct-type backlight according to claim 1, wherein a sectional shape of at least one of the plural light scattering members is a triangle.

3. The light pipe for a direct-type backlight according to claim 2, wherein a sectional shape of at least one of the plural light scattering members is a right triangle.

4. The light pipe for a direct-type backlight according to claim 1, wherein the light reflecting member is concave having a shape of an inverted cone shape.

5. The light pipe for a direct-type backlight according to claim 4, wherein the light reflecting member is concave having a curved surface obtained by 180° rotation with respect to y axis of a curved line satisfying the following expression (I):

$$y = a|x|^4 + b|x|^3 + c|x|^2 + d|x| + e \qquad (I)$$

$$(-t \leq x \leq t,\ -m/2 \leq y \leq m/2,\ -1 \leq a \leq 1,\ -2 \leq b \leq 2,$$
$$-3 \leq c \leq 3,\ -3 \leq d \leq 3,\ -m/2 \leq e \leq m/2,\ 0 < t \leq m)$$

wherein x is the horizontal distance (mm) from the origin; y is the vertical distance (mm) from the origin; a, b, c, d and e are constants; and m is the thickness (mm) of the light pipe, on the assumption of a coordinate system with x and y axes as horizontal and vertical axes passing through a center of gravity of the light pipe as the origin of the two coordinate axes.

6. The light pipe for a direct-type backlight according to claim 4, wherein the conical shape has: a diameter of the bottom surface of 3 to 10 mm; and a height of 0.1 to 2 mm.

7. The light pipe for a direct-type backlight according to claim 1, wherein a metal thin film is further formed along the light reflecting member.

8. The light pipe for a direct-type backlight according to claim 1, wherein a metal particle-dispersed resin layer is further formed along the light reflecting member.

9. The light pipe for a direct-type backlight according to claim 1, wherein the light scattering members are formed on the upper surface of the light pipe.

10. The light pipe for a direct-type backlight according to claim 1, wherein the number of light scattering members is from 50 to 700.

11. A direct-type backlight comprising the light pipe for a direct-type backlight according to claim 1.

12. The direct-type backlight according to claim 11, which further comprises a reflecting plate and an optical semiconductor device.

13. The direct-type backlight according to claim 12, wherein the reflecting plate has an opening portion, wherein the optical semiconductor device is disposed on the opening portion.

* * * * *